United States Patent
Tremelling et al.

(10) Patent No.: US 10,211,704 B2
(45) Date of Patent: Feb. 19, 2019

(54) FLUID-COOLED STATOR ASSEMBLIES HAVING MULTILAYER AND MULTIFUNCTIONAL TUBING

(71) Applicant: ABB Technology Ltd., Zürich (CH)

(72) Inventors: Darren Tremelling, Apex, NC (US); Steven Hudnut, Apex, NC (US); Heinz Lendenmann, Västerås (CH)

(73) Assignee: ABB Schweiz AG, Baden (CH)

( * ) Notice: Subject to any disclaimer, the term of this patent is extended or adjusted under 35 U.S.C. 154(b) by 561 days.

(21) Appl. No.: 14/839,925

(22) Filed: Aug. 29, 2015

(65) Prior Publication Data

US 2017/0063200 A1 Mar. 2, 2017

(51) Int. Cl.
*H02K 9/19* (2006.01)
*H02K 3/12* (2006.01)
*H02K 3/38* (2006.01)
*H02K 3/24* (2006.01)

(52) U.S. Cl.
CPC .............. *H02K 9/19* (2013.01); *H02K 3/12* (2013.01); *H02K 3/24* (2013.01); *H02K 3/38* (2013.01)

(58) Field of Classification Search
CPC .. H02K 1/20; H02K 1/32; H02K 9/00; H02K 9/19; H02K 3/12; H02K 3/24; H02K 3/38; H02K 15/00; H02K 15/02
See application file for complete search history.

(56) References Cited

U.S. PATENT DOCUMENTS

| 4,908,537 | A | * | 3/1990 | Sismour, Jr. | H02K 1/32 310/215 |
|---|---|---|---|---|---|
| 5,189,325 | A | * | 2/1993 | Jarczynski | H02K 9/19 310/54 |
| 2006/0038450 | A1 | * | 2/2006 | Matin | H02K 9/20 310/58 |
| 2006/0091761 | A1 | * | 5/2006 | Lafontaine | H02K 1/187 310/261.1 |
| 2008/0143200 | A1 | * | 6/2008 | Kalsi | H02K 1/12 310/58 |
| 2011/0248507 | A1 | * | 10/2011 | Petersen | H02K 1/20 290/55 |
| 2013/0076167 | A1 | * | 3/2013 | Lepres | H02K 9/19 310/54 |
| 2013/0076171 | A1 | * | 3/2013 | Lepres | H02K 1/20 310/59 |

\* cited by examiner

*Primary Examiner* — Tran Nguyen
(74) *Attorney, Agent, or Firm* — J. Bruce Schelkopf; Taft Stettinius & Hollister LLP

(57) ABSTRACT

A fluid-cooled stator assembly for electrical machines. The stator assembly may include a stator core having a back iron portion and a plurality of stator teeth. Each of the plurality of stator teeth may be separated from each other by at least one of plurality of slots, the slots being structured to receive placement of stator windings. The apparatus also includes a thermal management conduit that is positioned at various locations about the stator assembly, including within or along the back iron portion, stator teeth, slots, and/or among the stator windings. Further, the thermal management conduit may provide insulation for one or more coils of the stator windings. Additionally, at least a portion of the thermal management conduit may be formed from a thermally conductive polymer. The thermal management conduit is configured to convey a thermal management fluid in a heat exchange relationship with the stator assembly.

11 Claims, 8 Drawing Sheets

FLUID-COOLED STATOR ASSEMBLIES HAVING MULTILAYER AND MULTIFUNCTIONAL TUBING

BACKGROUND

Embodiments of the present disclosure generally relate to thermal management for electromagnetic systems. More particularly, but not exclusively, embodiments of the present disclosure relate to fluid-cooled stator assemblies that include thermally conductive polymer conduits.

During operation, electromagnetic systems, such as, for example, the electromagnetic systems of electric motors, generators, and alternators, among other electrical machines, typically experience electrical and/or mechanical losses. Such losses often contribute to the generation of thermal energy that, if not at least partially dissipated, may adversely impact the efficiency and/or life span of the associated electrical machine. Moreover, such dissipation of generated thermal energy may at least assist in the ability of an electrical machine to reliably operate over a range of loads and/or operating conditions.

Historically, electrical machines having electromagnetic systems have been air cooled. While air cooling may generally be convenient, when compared to liquid cooling, the heat transfer coefficients achieved using air cooling are typically relatively low. Thus, to compensate for generally low cooling efficiency, the air cooling systems of electrical machines are often equipped to attain a relatively high air flow rate across at least the electromagnetic system. Yet, such relatively high air flow rates are typically achieved, as well as the associated relatively large pressure differentials, via use of relatively large, loud, and/or costly air handling equipment.

In contrast, liquid cooling may provide heat transfer coefficients that are significantly higher than the heat transfer coefficients that are attained using air cooling. However, traditionally, liquid cooling systems have relied on direct contact between a liquid coolant and a heat-generating portion of the electromagnetic system. As a result, liquid cooling systems typically utilized a complicated system to contain, recycle, and/or replenish the liquid coolant. Further, such direct contact may limit the types of liquid coolants available for cooling to those that will not short, corrode, and/or otherwise degrade the performance of the electromagnetic system and/or of the associated electrical machine.

BRIEF SUMMARY

An aspect of the present disclosure is an apparatus having a stator core that includes a back iron portion and a plurality of stator teeth. Each of the plurality of stator teeth may be separated from another one of the plurality of stator teeth by a slot. The apparatus also includes a thermal management conduit that is positioned within at least one conduit passage in the stator core. Additionally, at least a portion of the thermal management conduit has a wall formed of a thermally conductive polymer. The thermal management conduit includes an inner passageway that is sized to receive circulation of a thermal management fluid. Moreover, the thermal management conduit is configured to convey the thermal management fluid in a heat exchange relation with at least the stator core.

Another aspect of the present disclosure is an apparatus that includes a stator core having a back iron portion and a plurality of stator teeth. The plurality of stator teeth are separated from each other by at least one of a plurality of slots. The apparatus also includes both a plurality of stator windings that extend through at least one of the plurality of slots and one or more thermal management conduits. The one or more thermal management conduits are positioned about at least a portion of the plurality of stator windings. Additionally, at least a portion of the one or more thermal management conduits has a wall formed of a thermally conductive polymer and an inner passageway that is sized to receive circulation of a liquid thermal management fluid. Further, one or more thermal management conduits are configured to convey the liquid thermal management fluid in a heat exchange relation with at least the plurality of stator windings.

Additionally, an aspect of the present disclosure is an apparatus that includes a rotor and a stator assembly, the rotor being is configured to rotate relative to a stator core of the stator assembly. The apparatus also includes a thermal management conduit that is comprised at least in part of a thermally conductive polymer, and which is configured to convey a liquid thermal management fluid that is in a heat exchange relation with the stator assembly.

BRIEF DESCRIPTION OF THE DRAWINGS

The description herein makes reference to the accompanying figures wherein like reference numerals refer to like parts throughout the several views.

Figure 1:
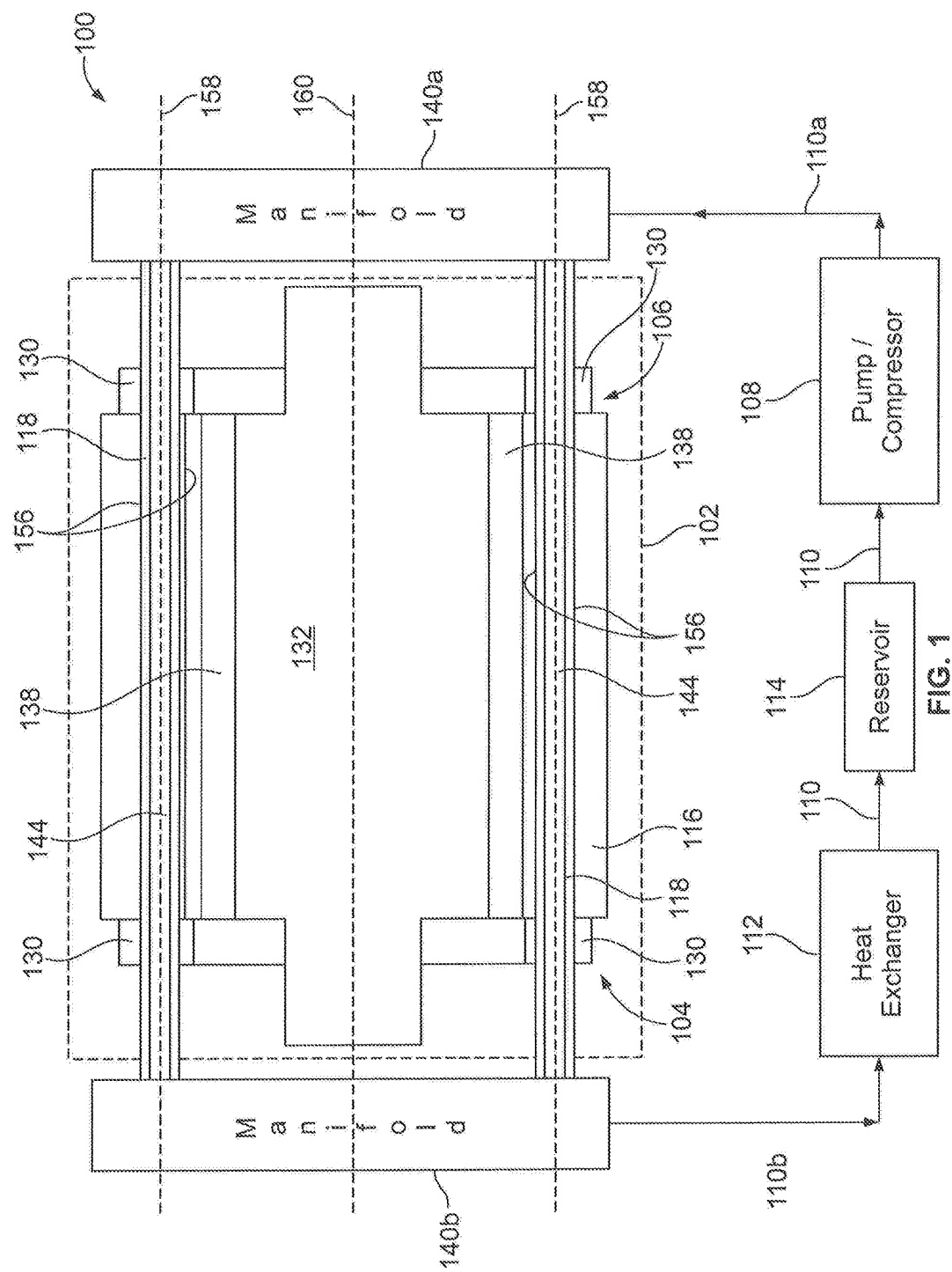
FIG. 1 illustrates a schematic representation of a thermal management system for an electrical machine having a fluid-cooled stator assembly according to an embodiment the present disclosure.

The foregoing summary, as well as the following detailed description of certain embodiments of the present disclosure, will be better understood when read in conjunction with the appended drawings. For the purpose of illustrating the disclosure, there is shown in the drawings, certain embodiments. It should be understood, however, that the present disclosure is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a schematic representation of a thermal management system 100 for an electrical machine 102 according to an embodiment the present disclosure. As illustrated, the electrical machine 102 includes an electromagnetic system 104 having a fluid-cooled stator assembly 106. The electromagnetic system 104 may be utilized in a variety of different types of electrical machines, including, for example, electric motors, generators, and alternators, among other electrical machines. Moreover, the electromagnetic system 104 may be utilized with electrical machines that generate, utilize, are powered by, and/or consume electrical energy and/or electric current. Additionally, the electromagnetic system 104 may be used with electrical machines that are utilized for a variety of different applications, including electrical machines that form a portion of an industrial and/or power generation facility.

According to certain embodiments, the thermal management system 100 includes one or more components that may facilitate the flow of a thermal management fluid through the thermal management system 100. For example, the thermal management system 100 may include a pump and/or compressor 108 that may at least assist in circulating a thermal management fluid along delivery lines 110 and the associated components of the thermal management system 100. Further, according to certain embodiments, the thermal management system 100 may also include components that are structured to assist in the dissipation of entrained heat from the thermal management fluid. For example, the thermal management system 100 may include a heat exchanger 112 that dissipates heat from the thermal management fluid into an ambient environment. Alternatively, heat dissipated by the heat exchanger 112 may be captured for other uses, including, for example, heating water for a boiler, among other uses.

According to the illustrated embodiment, the thermal management fluid is a liquid, such as, for example, a liquid coolant, water, glycol, and/or oil, among other liquids. Further, as discussed below in more detail, as the thermal management system circulates the thermal management fluid in conduits that include, at least in part, electronically insulative materials, according to certain embodiments, the thermal management fluid may an electrically conductive liquid, which may include, for example, potentially electrically conductive deionized water, among other coolants. However, according to other embodiments, the thermal management fluid may be, or include, a gas, such as, but not limited to, air and/or gaseous refrigerants. Additionally, as illustrated in FIG. 1, according to certain embodiments, the thermal management system 100 may include a reservoir 114 that is structure to collect and/or at least temporarily retain at least a portion of the thermal management fluid.

Figure 2:
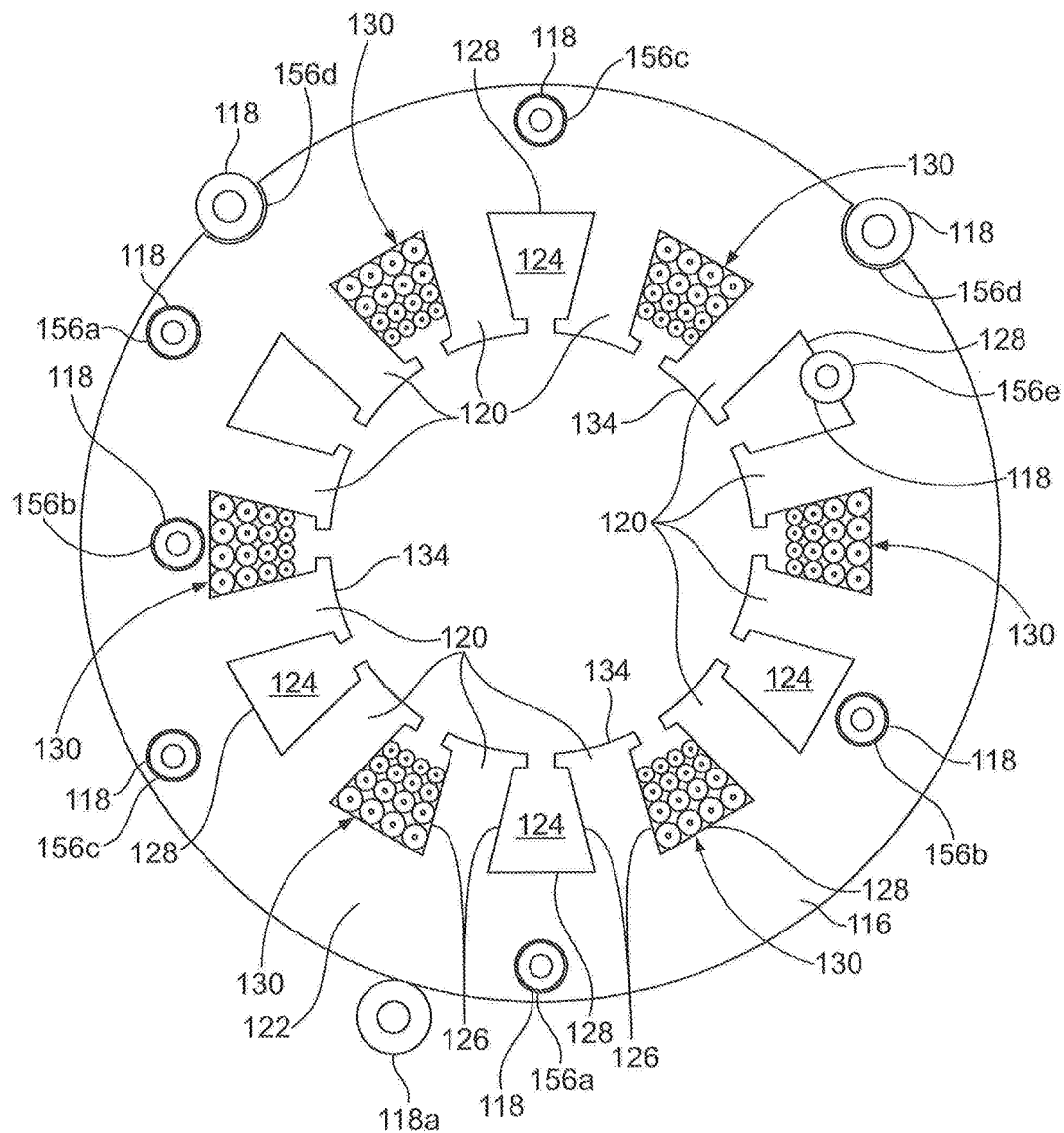
FIG. 2 illustrates an end or axial view of an exemplary stator core that includes one or more thermal management conduits positioned within conduit passages that are at various positions about a fluid-cooled stator assembly according to embodiments of the present disclosure.

The stator assembly 106 includes a stator core 116 that may comprise a plurality of sheets or laminations of a generally magnetically permeable material, such as, for example, sheets or laminations of steel or iron. FIG. 2 illustrates an end or axial view of an exemplary stator core 116 that includes a thermal management conduit 118. As depicted, the stator core 116 includes a plurality of stator teeth 120 that extend from a back iron portion 122 of the stator core 116. Each of the stator teeth 120 may be separated from an adjacent stator teeth 120 by a slot 124. In the depicted embodiment, the slot 124 may be generally defined, at least in part, by a pair of opposing side walls 126 of adjacent stator teeth 120 that inwardly extend away from an inner wall 128 of the back iron portion 122 of the stator core 116. At least a portion of the slots 124 are sized to receive placement of stator windings 130. Moreover, the slots 124 may be sized to separate stator windings 130 from one another and/or to retain stator windings 130 within the stator core 116. Additionally, according to certain embodiments, the stator teeth 120 may be structured to retain the stator windings 130 within their respective slots 124.

The electromagnetic system 104 further includes a rotor 132 that is configured for rotational displacement relative to at least the stator core 116. According to the depicted embodiment, inner edges 134 of the stator teeth 120 of the stator core 116 generally define a hollow inner region 136 of the stator core 116 that is sized to accommodate rotational displacement of at least a portion of the rotor 132. Further, an outer edge of the rotor 132 may be separated from the inner edges 134 of the stator teeth 120 by an air gap 138.

The thermal management system 100 further includes one or more thermal management conduits 118. The thermal management conduits 118 are structured to transport the thermal management fluid about and/or around at least the stator assembly 106, while also preventing fluid and/or electrical contact between the thermal management fluid and the stator assembly 106. Encasing or encapsulating thermal management fluid within thermal management conduits 118 may prevent or otherwise minimize direct exposure of at least the stator core 116 to the thermal management fluid, and thereby decrease the potential for corrosion of stator core 116 as well as decrease the potential for electrical communication between the thermal management fluid and the stator core 116.

As shown in FIG. 1, according to certain embodiments, the thermal management conduits 118 may be in fluid communication with one or more manifolds 140a, 140b of the thermal management system 100. For example, the thermal management system 100 may include an inlet manifold 140a that receives thermal management fluid via an inlet portion 110a of delivery lines 110, and which is configured to subsequently distribute the delivered thermal management fluid among one or more thermal management conduits 118. Further, according to certain embodiments, the thermal management system 100 may also include an outlet manifold 140b that is configured to collect heated thermal management fluid that is dispensed from the one or more thermal management conduits 118, and subsequently deliver the collected, heated thermal management fluid to an outlet portion 110b of the delivery lines 110. Further, although FIG. 1 illustrates a particular thermal management system 100, a variety of thermal management systems, including thermal management systems that are arranged as combinations of series and/or parallel cooling circuits, may be utilized.

The thermal management conduit 118 may be constructed at least in part from a generally thermally conductive material that provides relatively minimal resistance to the transfer of heat from the stator assembly 106 to the thermal management fluid that flows through the thermal management conduit 118. Such material may also provide minimal resistance to the subsequent release of heat that is entrained in the thermal management fluid to an ambient environment or other heat transfer device. For example, according to certain embodiments, the thermal management conduit 118 may be constructed from a thermally conductive polymeric material, such as, but not limited to, a thermally conductive polymer, a cross-linked polyethylene that has relatively high temperature capabilities, thermally conductive co-polyester elastomer, thermally conductive liquid crystalline polymer, thermally conductive polyamide, thermally conductive polypropylene, thermally conductive polyphenylene sulfide, thermally conductive thermoplastic elastomer, and/or any other suitable polymeric material that is thermally conductive and/or includes or incorporates a thermally conductive filler material. Further, according to certain embodiments, the thermal management conduit 118 may be constructed from a polymer having a thermal conductivity of at least 0.1 Watts/(meter/Kelvin) (W/mK), and, in at least certain circumstances, may exceed 15 Watts/(meter/Kelvin) (W/mK).

Additionally, according to certain embodiments, the thermal management conduit 118 may also be constructed from, at least in part, or otherwise include, a generally electrically insulative material. The inclusion of a generally electrically insulative material, and/or the use of a thermally conductive material that has electrical insulating properties, in the structure of the thermal management conduit 118 may prevent or minimize the thermal management conduit 118, and/or the thermal management fluid contained therein, from contributing to potential electrical losses during the operation of the electromagnetic system 104. Additionally, the use of electrically insulative materials in connection with at least the thermal management conduit 118 may at least assist in the ability of the stator assembly 106 to be used in both grounded and non-grounded electrical machines 102.

Selection of material for the thermal management conduit 118 may therefore be based, at least in part, on both the ability of the material to not inhibit heat transfer to/from the thermal management fluid, as well as the ability of the material to not conduct an electric current when the thermal management conduit 118 is under the influence of an electric field. Illustrative, non-exclusive examples of electrically insulating polymers include, but are not limited to, polyethylene, polypropylene, a fluoropolymer, and/or polytetrafluoroethylene. Further, illustrative, non-exclusive examples of electrical resistivity for the material(s) and/or structure of the thermal management conduit 118 include electrical resistivity that may be greater than 1010 ohms centimeter (ohm-cm), and, in at least certain circumstances, may exceed 1017 ohms centimeter (ohm-cm).

According to certain embodiments, the thermal management conduit 118 includes an inner passageway 144 that is configured to receive thermal management fluid that is being circulated about the thermal management system 100. Further, the thermal management conduit 118 may, according to certain embodiments, be a monolithic structure that is manufactured from a generally thermally conductive and electrically insulative material. Alternatively, the thermal management conduit 118 may include a plurality of layers or segments of similar or dissimilar materials. For example, referencing FIG. 4, according to certain embodiments, the thermal management conduit 118 includes at least a portion, layer, or segment that is constructed from a first, thermally conductive material, while another portion, layer, or segment of the thermal management conduit 118 is constructed from a second material, the second material being a generally electrically insulative material that is different than the first material. For example, according to certain embodiments, the thermal management conduit 118 may be a co-extruded tube having a first, inner tube 141 and a second, outer tube or coating 142. According to such an example, the first, inner tube 141 may be constructed from an at least thermally conductive material and include the inner passageway 144 that is sized for the flow of the thermal management fluid. The second, outer tube or coating 142, may extend about or around at least a portion of the first, inner tube, and may be constructed from an at least an electrically insulative material. According to another embodiment, as discussed below the second outer tube or coating 142 may be an electrically insulative filler material may be positioned about at least a portion of the first, inner tube 14, and a segment that includes the inner passageway 144.

According to certain embodiments, at least one layer of the thermal management conduit 118 may comprise a porous material, while another layer of the thermal management conduit 118 is a non-porous material. For example, the thermal management conduit 118 may comprise a first, generally porous, thermally conductive layer, and a second, non-porous electrically insulative layer. According to other embodiments, the thermal management conduit 118 may include at least two thermally conductive layers, at least one of which is generally porous, and at least one of which is generally non-porous. Such a construction may also include a generally porous or non-porous electrically insulative layer.

Additionally, according to certain embodiments, the thermal management conduit 118 may include one or more layers or coatings that provide a relatively effective diffusion barrier. For example, according to certain embodiments, the thermal management conduit 118 may include a diffusion barrier that at least attempts to prevent and/or minimize the diffusion of oxygen and/or water, among other items, from the thermal management conduit 118. A variety of different materials may us utilized for the diffusion layer(s), including, but not limited to, ethylene alcohol (EVOH), metallic materials, metallized materials including metallized polyester (PET), glass, steel, polymers or thermoplastics including polyethylene terephthalate (PET), polyamide (PA), poly-alpha-olefin (PAO), polylactic acid (PLA), poly(p-phenylene oxide) or poly(p-phenylene ether) (PPE), polyethylene (PE), polyphenylene Oxide (PPO), and polyvinylidene chloride (PVDC), among other materials, Selection of the particular material(s) used for the diffusion layer(s) may be based on a variety of factors, including, but not limited to, electrical conductivity, potential to facilitate parasitic losses, rigidity and/or brittleness, and/or the ability to attain low contact resistance, among other factors.

The thermal management conduit 118 may have a variety of different shapes and/or sizes, including, for example, having a circular, oval, non-round, square, rectangular, polygonal, elliptical, and/or trapezoidal cross-sectional shape, among other shapes. Further, as shown in at least FIG. 3, the thermal management conduit 118 may include an inner wall 146 that generally defines the inner passageway 144 through which thermal management fluid may flow. Further, the inner passageway 144 may be sized to accommodate a flow of the thermal management fluid through the thermal management conduit 118 at a flow rate that facilitates the dissipation of heat from at least the stator core 116 via the thermal management fluid. Further, the size of the passageway maybe based at least in part, among other considerations, on the type, composition, and/or properties of the fluid that is used for the thermal management fluid. Thus, the inner passageway 144 may have a variety of sizes, such as, for example, having a diameter between around 5 millimeters (mm) and 20 millimeters (mm). Further, the wall 148 between the inner and outer walls 146, 150 of the thermal management conduit 118 may have a wall thickness that generally resists at least certain compromises in the structural integrity of the thermal management conduit 118, such as, for example, resists the formation or tears or cracks in the wall 148, while also providing minimal interference with the ability of the of the thermal management conduit 118 to accommodate the transfer of heat to/from the heat management fluid. For example, according to certain embodiments, the wall 148 may have a wall thickness of about at least 0.25 millimeter (mm) to about 10 millimeter (mm).

Figure 3:
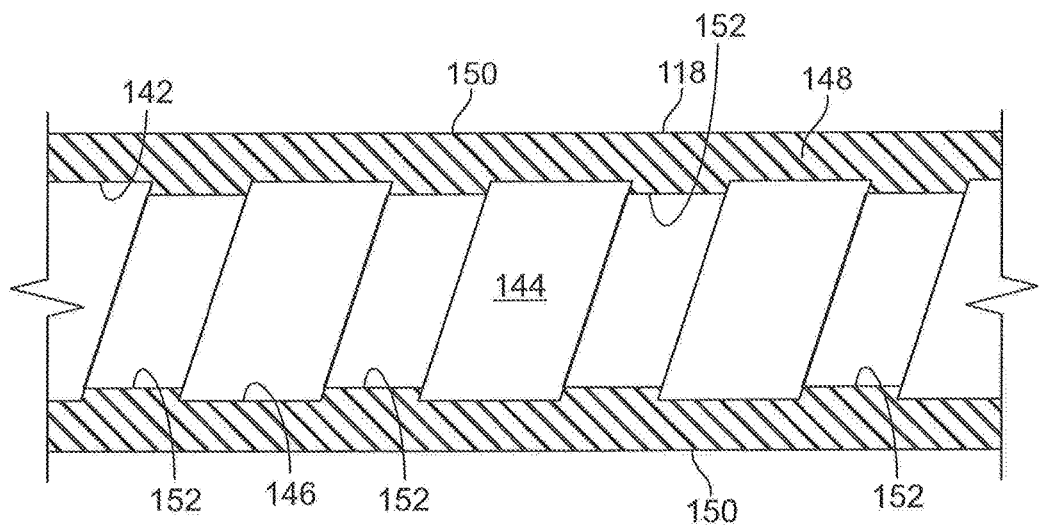
FIG. 3 illustrates a cross sectional side view of a portion of a thermal management conduit that includes ribs, fins, and/or coils along an inner surface of an inner passageway.

According to certain embodiments, the inner wall 146 of the inner passageway 144 may be configured to facilitate turbulence in the flow of the thermal management fluid through the inner passageway 144. For example, as illustrated in FIG. 3, according to certain embodiments, the inner wall 146 of the inner passageway 144 may include one or more helical ribs, fins, and/or coils 152 that induce turbulence in the flow of thermal management fluid, which may enhance the degree to which the thermal management fluid absorbs heat. According to certain embodiments in which the thermal management conduit 118 is formed via extrusion, such helical features along the inner wall 146 may be formed by changing an angle of a puller that exerts a pulling force on the extruded thermal management conduit 118.

Figure 4:
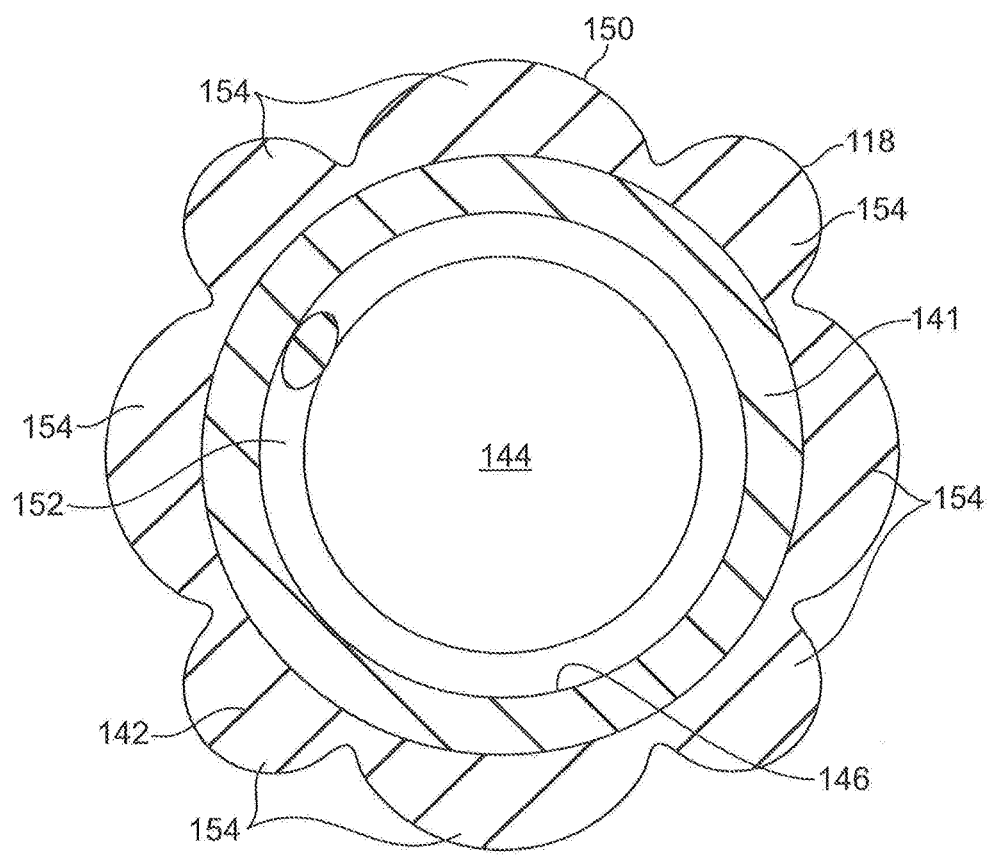
FIG. 4 illustrates a cross sectional end view of a portion of a thermal management conduit that includes one or more ribs along an outer side of a thermal management conduit.

FIG. 4 illustrates an embodiment of the thermal management conduit 118 in which at least a portion of an outer wall 150 of the thermal management conduit 118 includes one or more ribs or fins 154. Such ribs or fins 154 may extend in a variety of different directions along the thermal management conduit 118, including, for example, axially, spirally, or helically along the outer wall 150. Further, such ribs or fins 154 may be deformable such that, as discussed below, as a positive pressure is exerted against the inner passageway 144, the size of the thermal management conduit 118 expands within a conduit passage 156 in the stator core 116 such that spaces between the ribs or fins 154 may become occupied by material of the thermal management conduit 118. The ribs or fins 154 may be constructed from a variety of materials, including, for example, thermally conductive, electrically conductive, and/or magnetic materials, as well as a combination thereof. Additionally, according to certain embodiments, the ribs or fins 154 may also be used for mechanical engagement functions, as illustrated for example by below-discussed FIG. 11C.

The thermal management conduit 118 may be positioned at a variety of locations, or combination of locations, about the stator assembly 106. Further, the thermal management conduit 118 may be positioned relative to the stator assembly 106 such that the thermal management conduit 118 is in direct or indirect thermal communication or conductive thermal communication with an adjacent portion of the stator assembly 106. For example, according to certain embodiments, at least a portion of the thermal management conduit 118 may be in direct physical contact with an adjacent portion of the stator assembly 106. Further, according to other embodiments, at least a portion of the thermal management conduit 118 may be indirect thermal communication with other adjacent portions of the stator assembly 106, including, for example, via a filler material that may occupy a space, if any, between the thermal management conduit 118 and an adjacent portion of the stator assembly 106.

Figure 5:
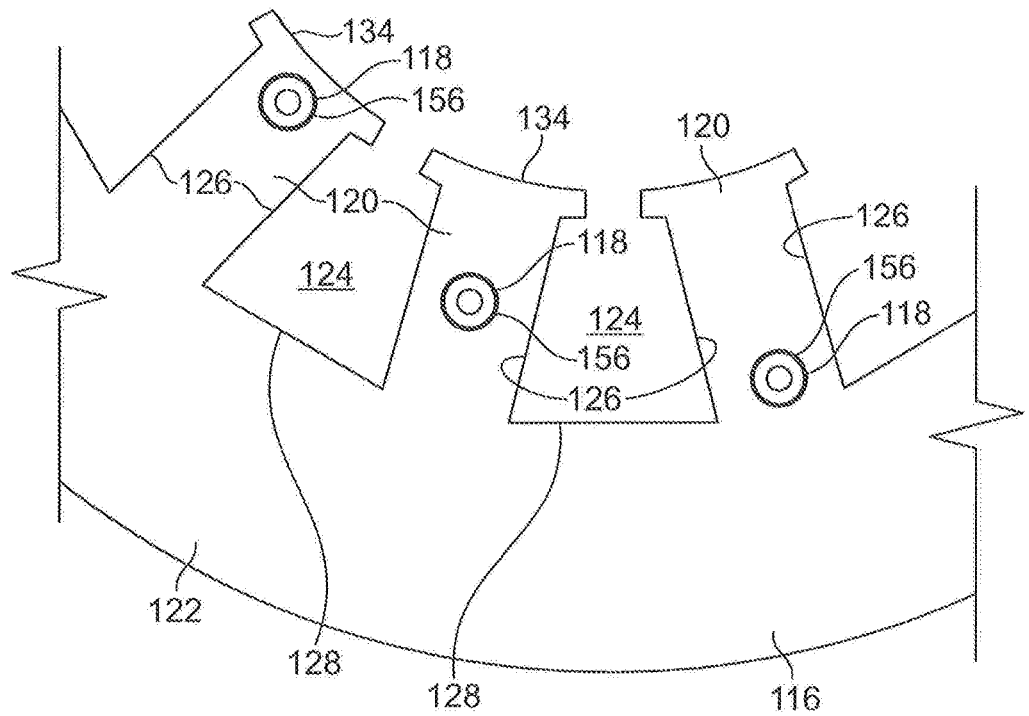
FIG. 5 illustrates a side view of a portion of an exemplary stator core that includes one or more thermal management conduits positioned within conduit passages along or about one or more stator teeth of a stator core according to embodiments of the present disclosure.

As illustrated in at least FIGS. 1, 2, and 5, the thermal management system 100 may include one or more conduit passages 156 that extend along and/or about at least a portion of the stator assembly 106, and which are sized to receive insertion of at least a portion of a thermal management conduit 118. For example, as discussed below, according to certain embodiments, one or more thermal management conduits 118 may extend through at least a portion of the stator core 116, including, for example, within and/or against a portion of the back iron portion 122, one or more stator teeth 120, and/or one or more slots 124 of the stator core 116, as discussed below. The conduit passages 156 may be formed in the stator core 116 in a variety of different manners, including, for example, via machining, casting, or casting of the stator core 116, and/or during the manufacture of the sheets or laminations used to form the stator core 116. Further, according to certain embodiments, the conduit passages 156 may be formed or otherwise provided as grooves, slots, or recesses along an outer periphery of the stator core 116.

The conduit passages 156 may have a variety of different shapes that are sized to receive placement of a thermal management conduit 118. For example, according to certain embodiments, the conduit passages 156 may have square, rectangular, circular, polygonal, elliptical, non-round, and/or trapezoidal cross-sectional shapes or collections of shapes. Further, the conduit passages 156 may be shaped and/or sized to influence the shape of at least a portion of the received thermal management conduit 118. For example, according to certain embodiments, the conduit passage 156 may have a size that eliminates or minimizes the presence of thermal resistance between the stator assembly 106 and the thermal management conduit 118. For example, the outer wall 150 of thermal management conduit 118 and/or the conduit passage 156 may be sized to prevent the presence of air gaps between the outer wall 150 and the conduit passage 156. Accordingly, the outer wall 150 may be configured to have a size that is similar to or larger than the corresponding size of the conduit passage 156, or vice versa, at least when thermal management fluid is being circulated through the thermal management conduit 118. Such sizing may prevent the presence of air gaps therebetween, and, moreover, facilitate physical thermal contact between the thermal management conduit 118 and adjacent portions of the stator assembly 106.

According to certain embodiments, assembly or positioning of the thermal management conduit 118 into a conduit passage 156 having a similar or smaller cross sectional size may be achieve by temporarily reducing, contracting, and/or deforming the thermal management conduit 118 from a first size and/or shape to a second, smaller size and/or shape. For example, according to certain embodiments, the second size and/or shape may be attained by folding the thermal management conduit 118 over at least a portion of itself, applying a negative pressure to the thermal management conduit 118, and/or otherwise deforming a shape of the thermal management conduit 118. With the thermal management conduit 118 at least partially positioned within the conduit passage 156, the thermal management conduit 118 may subsequently be restored to the first size and/or shape, such as, for example, via releasing a vacuum draw on the thermal management conduit 118, releasing a compressive or deforming force on the thermal management conduit 118, and/or pressuring the thermal management conduit 118. Further, according to certain embodiments, the thermal management conduit 118 may have a size that is smaller than the first size in the absence of the thermal management fluid being circulated through the inner passageway 144 by a force of the pump/compressor 108. According to such an embodiment, the thermal management conduit 118 may expand to the first size upon thermal management fluid being circulated through the inner passageway 144 by a positive pressure associated with operation of the pump/compressor 108.

Referencing FIGS. 1, and 2, according to certain embodiments, one or more conduit passages 156 that are sized to receive placement of the thermal management conduit 118 may be positioned along or about different portions of the back iron portion 122. For example, according to the embodiment depicted in FIGS. 1 and 2, one or more of the conduit passages 156 may each extend along an axial axis 158 that is/are non-intersecting or parallel to a central longitudinal axis 160 of the inner region 136 of the stator core 116. However, the conduit passages 156 may have a variety of other orientations, either individually or collectively, through the stator core 116. Further, according to certain embodiments, one or more conduit passages 156 that extend through the stator core 116 may be in fluid communication with at least one other conduit passage(s) 156 that extends through the stator core 116 and/or another portion of the stator assembly 106.

Further, the conduit passages 156, and thus the thermal management conduits 118, may be positioned at various locations, or combinations of locations, along and/or against the back iron portion 122. For example, as illustrated in FIG. 2, according to certain embodiments, conduit passages 156a, 156b, 156c may extend along or near a mid-section of the back iron portion 122 relative to the inner and outer walls 128, 162 of the back iron portion 122. According to such an embodiment, the thermal management fluid flowing through the thermal management conduit 118 may generally be employed to cool at least the stator core 116. Further, one or more of the conduit passages 156d, 156e may be located near or at the outer wall 162 of the back iron portion 122 and/or at or near the inner wall 128 of the back iron portion 122. According to certain embodiments, one or more of the conduit passages 156d, 156e may be positioned and have a depth such that at least a portion of the thermal management conduit 118 that is received in the conduit passage 156d, 156e extends out of the conduit passage 156. According to such an embodiment, at least a portion of the thermal management conduit 118 extends beyond the inner or outer walls 128, 162, respectively, of the back iron portion 122 of the stator core 116. Alternatively, according to certain embodiments, rather than utilizing a conduit passage 156, one or more thermal management conduits 118a may be positioned against the inner wall 128 and/or the outer wall 162 of the back iron portion 122 of the stator core 116. Further, when a thermal management conduit 118 is positioned in a conduit passage 156 that is in proximity to, or extends along, the inner wall 128, the thermal management fluid therein may be generally employed to cool the stator windings 130 and/or the stator core 116, or a combination thereof.

Referencing FIG. 5, according to certain embodiments, one or more conduit passages 156 may also be positioned within or along one or more of the stator teeth 120. Similar to the back iron portion 122, the conduit passages 156 may be positioned at a variety of different locations, or combinations of locations, about the stator teeth 120. Further, the particular location of the conduit passages 156 may influence the nature of the cooling effect that may be provided by the thermal management fluid. Moreover, the position of the conduit passages 156 along the stator tooth 120 may influence the extent that the thermal management fluid circulating through the thermal management conduit 118 is absorbing heat from the stator core 116, and specifically the back iron portion 122, compared to heat that may be absorbed by the thermal management fluid from adjacent stator winding 130 and/or from the rotor 132. For example, thermal management fluid that is circulated through a thermal management conduit 118 that is positioned in a conduit passage 156 that is in relative close proximity to the inner edge 134 of the stator teeth 120 may have more influence on the cooling of the rotor 132 than if that conduit passage 156 was in relatively closer proximity to the inner wall 128 of the back iron portion 122. Similarly, thermal management fluid that is circulated through a thermal management conduit 118 that is positioned in a conduit passage 156 that is in relative close proximity to a side wall 126 of a stator tooth 120 may have more influence on the cooling of an adjacent the stator windings 130 than if the conduit passage 156 were positioned closer to a midsection of the stator tooth 120.

According to certain embodiments, the thermal management conduit 118 may be present in, coextensive with, and/or form a portion of stator windings 130. For example, as demonstrated by at least FIG. 6, according to certain embodiments the thermal management conduit 118 may be positioned around or about, and be separate from the stator windings 130 as well as the associated winding insulation. For example, according to certain embodiments, the thermal management conduit 118 that is positioned and/or intermingled with the stator windings 130 may be co-extruded with the winding insulation 164 of the stator windings 130. Inclusion of the thermal management conduit(s) 118 with the stator windings 130 may facilitate the relatively direct removal of generated heat from at least the stator windings 130. Further, according to such embodiments, one or more of the thermal management conduits 118 may be positioned in the slot 124 against the inner wall 128 of the back iron portion 122 of the stator core 116 and/or against a side wall 126 of a stator tooth 120.

Figure 6:
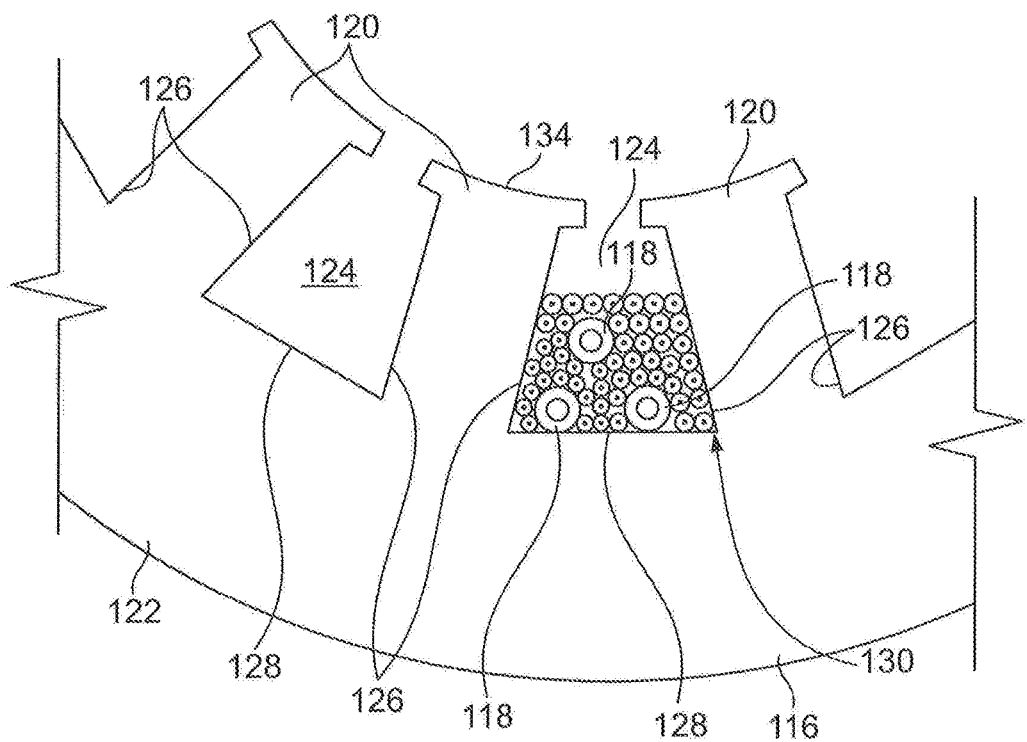
FIG. 6 illustrates a side view of a portion of an exemplary stator core that includes one or more thermal management conduits positioned within a slot of a stator core with stator windings according to an illustrated embodiment of the present disclosure.
Figure 7:
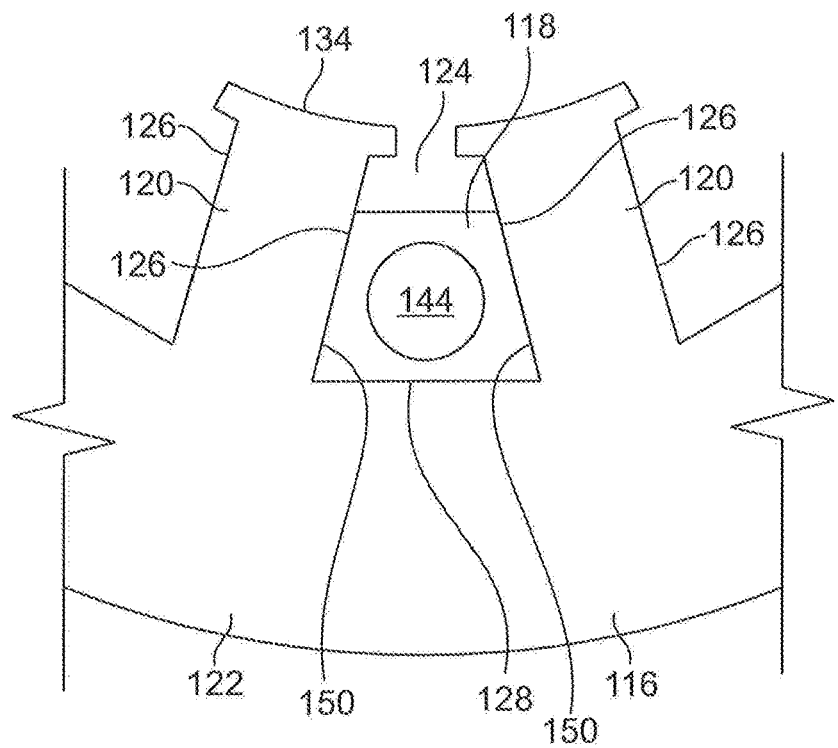
FIG. 7 illustrates a side view of a portion of an exemplary stator assembly that includes a thermal management conduit positioned along at least a portion of a slot of a stator core according to an embodiment of the present disclosure.

For example, as shown in FIG. 6, in addition to, or in lieu of, the stator windings 130, at least a portion of the slot 124 of the stator core 116 may be occupied by one or more thermal management conduits 118. For example, according to certain embodiments, the occupied portion of the slot 124 may be occupied by thermal management conduits 118, such as, for example, 20%-99% of the occupied space, while the remainder of the occupied portion of the slot 124 is occupied by stator windings 130. Conversely, according to other embodiments, at least a portion of the occupied portion of the slot 124 may be comprised of the thermal management conduit 118 and without the presence of stator windings 130. For example, in the embodiment shown in FIG. 7, the outer wall 150 of the thermal management conduit 118 may have a size and/or shape that generally conforms to the shape of the slot 124. For example, in the depicted embodiment, the outer wall 150 of the thermal management conduit 118 may have a trapezoidal or wedge shape. Such a configuration may assist the thermal fluid that flows through the inner passageway 144 of the thermal management conduit 118 in not only removing generated heat from the stator core 116, but also from the stator windings 130, the rotor 132, and/or the air gap 138 between the stator core 116 and the rotor 132. Further, according to such an embodiment, at least a portion of the heat entrained in the thermal management fluid may be dissipated to air in the air gap 138 between the rotor 132 and stator core 116.

Referencing FIG. 1, according to certain embodiments, the thermal management conduit 118 may exit from a conduit passage 156 at one or more ends 166 of the stator core 116 and extend into end winding portions 168 of the stator windings 130. Additionally, according to certain embodiments, the thermal management conduit 118 may be wound among or within, or otherwise placed with or on, the end winding portions 168 of the stator windings 130, and more specifically, the portion of the stator windings 130 that extends past, or outside of the one or more ends 166 of the stator core 116.

Figure 8:
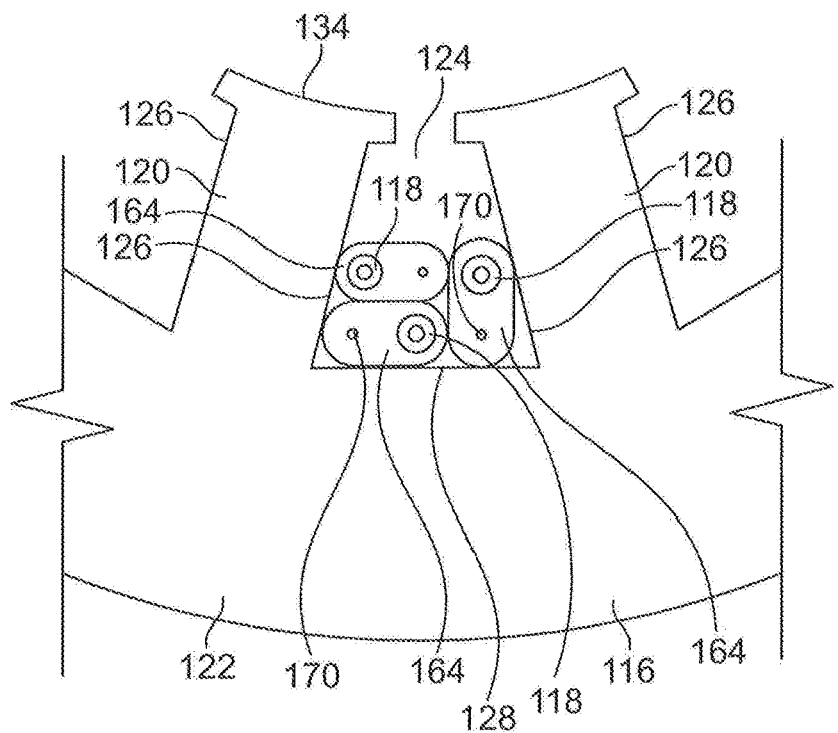
FIG. 8 illustrates a thermal management conduit and a coil of a stator winding encapsulated, encased, and/or at least partially covered by winding insulation according to an embodiment of the present disclosure.
Figure 9:
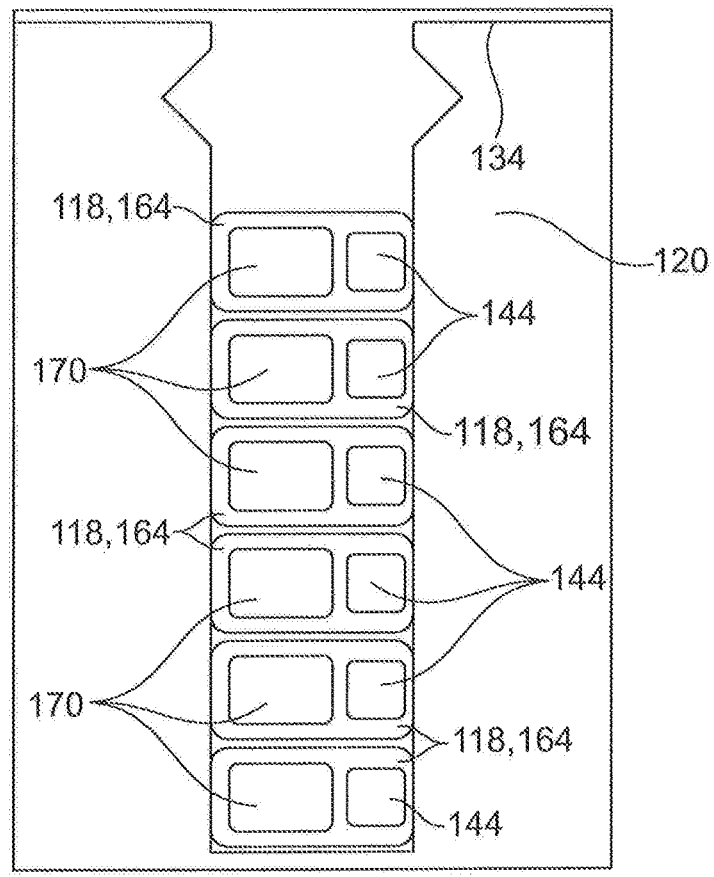
FIG. 9 illustrates a thermal management conduit that includes a coil for a stator winding according to an embodiment of the present disclosure.

Referencing FIGS. 8 and 9, according to certain embodiments, the thermal management conduit 118 may be at least partially least encapsulated, surrounded by, or otherwise incorporated into the winding insulation 164. For example, as shown in FIG. 8, winding insulation 164 may encapsulate, encase, or positioned against at least a portion of the thermal management conduit and a coil(s) 170 of the stator windings 130. Alternatively, as demonstrated by FIG. 9, according to other embodiments, in addition to the inner passageway 144, the thermal management conduit 118 may also include one or more coil(s) 170 for the stator windings 130. Moreover, the thermal management conduit 118 may be winding insulation 164 of the stator windings 130 that contains one or more coils 170 of the stator windings 130 as well as one or more voids therein that may provide one or more inner passageways 144 for the flow of thermal management fluid. According to such an embodiment, the thermal management conduit 118, and thus the winding insulation 164, may have a variety of different shapes and sizes, and the coil(s) 170 contained therein may be arranged at a variety of locations relative to the inner passageway 144. Further, according to certain embodiments, such thermal management conduits 118, may be wound and/or placed in the slots 124 of the stator core 116 during assembly with other coils 170 or bundle of coils 170. Alternatively, the thermal management conduit 118 may include a plurality of coils 170, in addition to the inner passageway 144, which may together be placed in the corresponding slot 124, and thereby may improve the ease with which the stator assembly 106 may be assembled.

Figure 10:
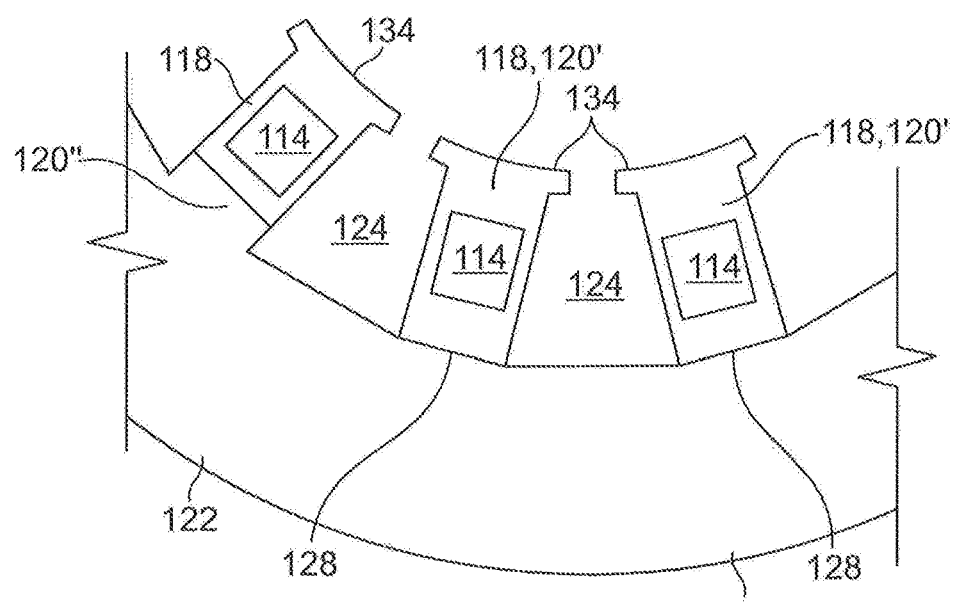
FIG. 10 illustrates examples of a thermal management conduit forming at least a portion of a stator tooth of a stator core according to an embodiment of the present disclosure.

Referencing FIG. 10, according to certain embodiments, the thermal management conduit 118 may form a portion of the stator core 116. For example, according to certain embodiments, the thermal management conduit 118 may provide one or more stator teeth 120' that are configured to locate and/or retain stator windings 130 within the stator assembly 106 and/or to separate stator windings 130 from adjacent stator windings 130. According to certain embodiments, the thermal management conduit 118 inwardly extends from the inner wall 128 of the back iron portion 122. In such situations, a portion of the thermal management conduit 118 may be in direct contact with the back iron portion 122, while another portion of the back iron portion 122 is in direct contact with stator windings 130. Alternatively, the thermal management conduit 118 may inwardly extend from a reduced portion of the stator tooth 120". In such situations, the thermal management conduit 118 may be coupled to the back iron portion 122 or the stator tooth 120''', such as, for example, by an adhesive or mechanical fastener, including a pin, bolt, rivet, or screw, among other connections.

Figure 11A:
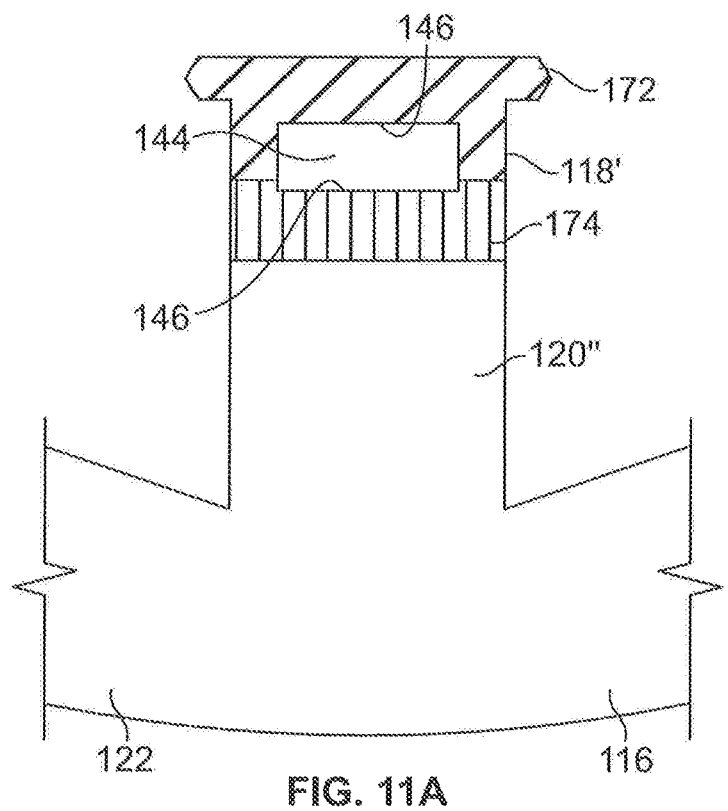
FIGS. 11A and 11B illustrate examples of thermal management conduits having multiple segments of different materials and which form a portion of a stator tooth according to an embodiment of the present disclosure.
Figure 11B:
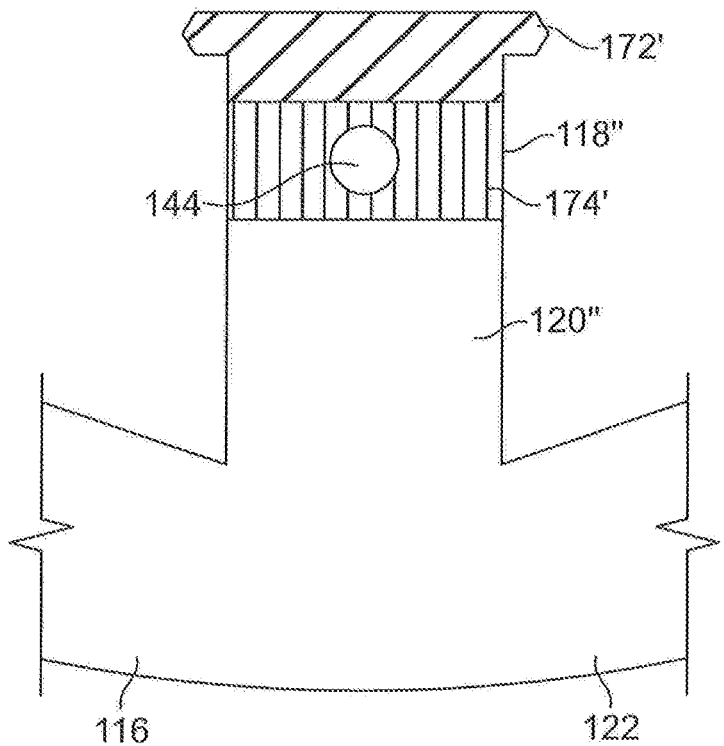

FIGS. 11A and 11B illustrate examples of thermal management conduits 118', 118" having multiple segments of different materials and which form a portion of a stator tooth 120 according to an embodiment of the present disclosure. More specifically, FIG. 11A illustrates a thermal management conduit 118' having a first segment 172 and a second segment 174. According to certain embodiments, the first segment 172 is constructed or formed by a pultrusion or co-extrusion process. Such a process may form a fiber reinforced polymer comprising a filler material that is impregnated by a resin, such as, for example, polyester, polyurethane, vinylester, and epoxy, among other resins. A variety of different filler materials may be incorporated, including, for example, fiberglass, a ceramic or aluminum based or containing material, glass, as well as magnesium diboride (MgB2), among other materials. Such a stator tooth 120 structure may be particularly suited for use in airgap winding machines, where such configurations of the stator tooth 120 may allow for at least relatively slight reductions in the effective air-gap, integration of cooling, winding support and/or winding insulation functionality.

The second segment 174 may be formed from a variety of different thermally conductive polymers, as discussed above, including, for example, an elastomer. According to certain embodiments, the second segment 174 is formed from an extruded polyethylene that includes a filler material that may assist in the high temperature capability of the second segment 174. Moreover, the second segment 174 may be a cross-linked polyethylene that has relatively high temperature capabilities. However, the second segment 174 may also be formed from a variety of other, thermally conductive materials, as identified above.

As shown, in FIG. 11A, the first segment 172 and the second segment 174 may be coupled together in a manner that forms the inner passageway 144 that is sized to accommodate the passage of the thermal management fluid therebetween. Moreover, each of the first and second segments 172, 174 may provide at least a portion of the inner wall 146 of the inner passageway 144.

FIG. 11B illustrates another example of the thermal management conduit 118 being comprised of first and second segments 172', 174', and which forms a portion of the stator tooth 120. The embodiment depicted by FIG. 11B provides an inner passageway 144 in the second segment 174'. Moreover, the inner passageway 144 shown in FIG. 11B does not extend into the first segment 172'. Further, according to the illustrated embodiment, the first segment 172', which is in closer proximity to the rotor 132 than the second segment 174', may be formed at least in part using a magnetic material. For example, according to the depicted embodiment, the first segment 172' may be formed using the pultrusion process and the filler and/or resin material may be impregnated with a magnetic material, such as, but not limited to, soft or hard ferrites, nickel, and cobalt alloys, among other magnetic materials. Further, according to such an embodiment, as the thermal management fluid does not circulate through the first segment 172', the first segment 172' may, in addition to including a magnetic material, may, but not necessarily, be generally electrically conductive, while the second segment 174' through which the thermal management fluid circulates is generally a non-electrically conductive material.

Figure 11C:
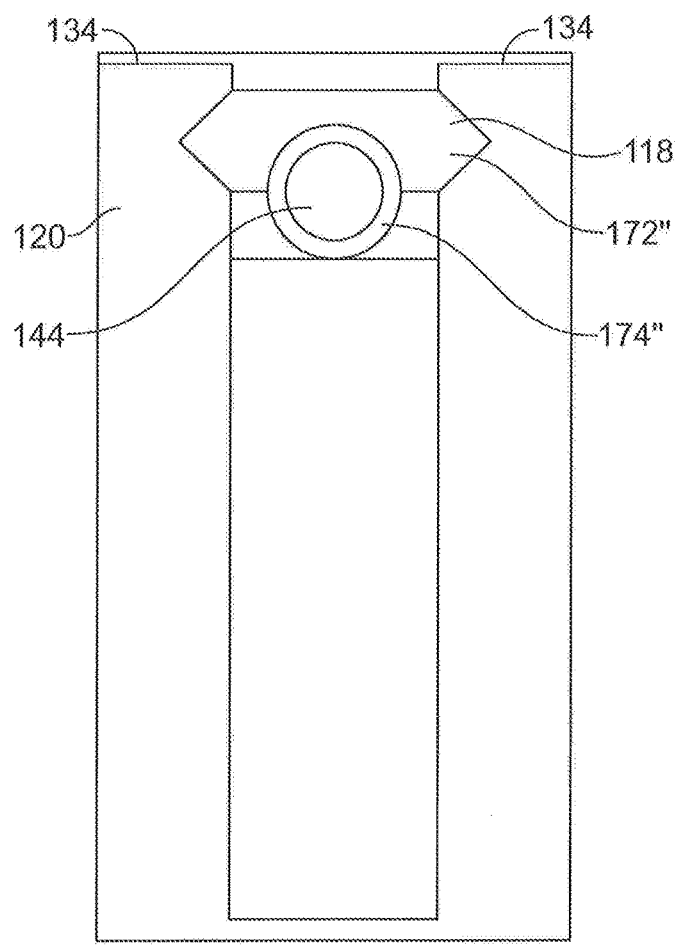
FIG. 11C illustrates an example of a thermal management conduit having multiple segments of different materials and which is positioned in a slot of a stator core according to an embodiment of the present disclosure.

While FIGS. 11A and 11B are discussed above in terms of being a portion of the stator tooth 120", according to other embodiments, the discussed first and second segments 172, 172', 174, 174' may be utilized for a thermal management conduit 118 that is positioned in other portions of the stator assembly 106. For example, FIG. 11C illustrates a thermal management conduit 118 having multiple segments, and which is positioned in one or more slots 124 of the stator core 116. As shown, the first segment 172", which is separate from the inner passageway 144, may at least in part include a magnetic material, such as, for example, a magnetic filler material that is included with a pultrusion or extruded composition of the first segment 172". Additionally, in the depicted embodiment, the first segment 172" may be adjacent to the inner wall 128 of the back iron portion 122. However, according to other embodiments, the first segment 172" may be on an opposing end of the thermal management conduit 118 away from the back iron portion 122. Further, such a construction may also be utilized in conduit passages 156 in the stator core 116, as well as against other portions of the stator core 116 or stator assembly 106.

Figure 12:
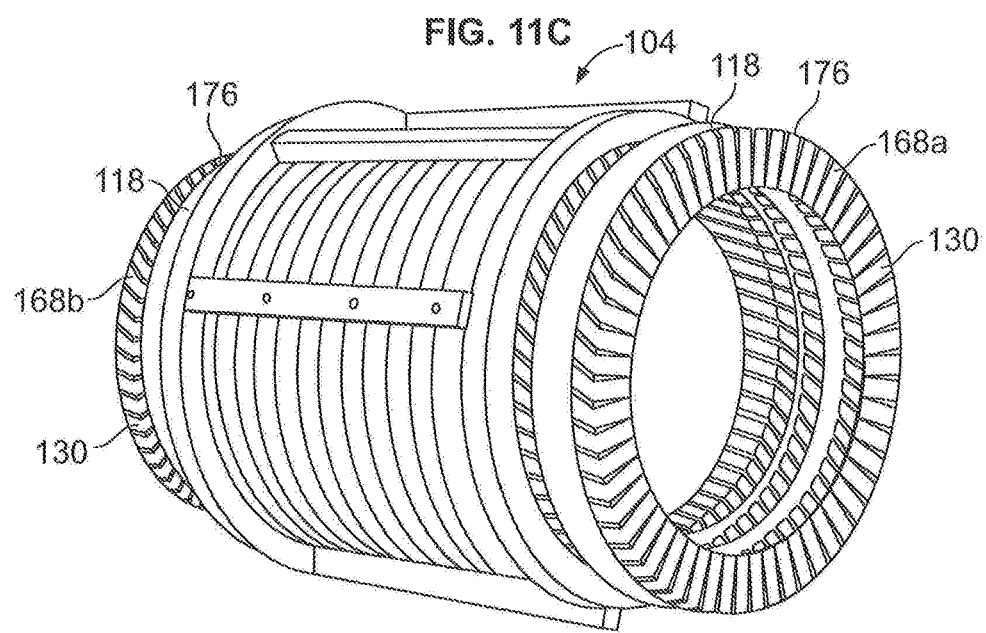
FIG. 12 illustrates a perspective side view of an exemplary fluid-cooled stator assembly that includes one or more thermal management conduits positioned about an outer surface of the end windings of the stator windings.

Additionally, according to certain embodiments, the thermal management conduit 118 may be positioned about a perimeter or periphery of the stator windings 130. For example, as shown in FIG. 12, according to certain embodiments, a thermal management conduit 118 may extend along at least a portion of an outer perimeter or circumference of one or both of the end winding portions 168a, 168b of the stator windings 130. Traditionally, the temperature rise between an outer surface 176 and other portions of the end winding portions 168a, 168b is relatively minimal compared to the thermal resistance and temperature rise from at least the outer surface 176 of the end winding portions 168a, 168b and the surrounding ambient air. However, the inclusion of a thermal management conduit 118 about at least a portion of the outer surface 176 that circulates the thermal management fluid may absorb heat from the end winding portions 168a, 168b to facilitate a reduction in the overall thermal resistance from the end winding portions 168a, 168b and the surrounding ambient air. Further, the thermal management conduit 118 may be positioned about the end winding portions 168a, 168b in a variety of configurations, including, for example, extending one or more times around the outer circumference of the outer surface 176.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
a stator core having a back iron portion and a plurality of stator teeth, each of the plurality of stator teeth separated from another one of the plurality of stator teeth by a slot; and
a thermal management conduit positioned within at least one conduit passage in the stator core, at least a portion of the thermal management conduit having a wall formed of a thermally conductive polymer, the thermal management conduit having an inner passageway sized to receive circulation of a thermal management fluid,
wherein the thermal management conduit is configured to convey the thermal management fluid in a heat exchange relation with at least the stator core,
wherein at least one of the at least one conduit passage is positioned in at least one of the plurality of stator teeth; and
wherein the inner passageway of the thermal management conduit is generally defined by an inner wall, at least a portion of the inner wall having a helically oriented protrusion.

2. The apparatus of claim 1, wherein the thermal management conduit has a first size at least when the thermal management fluid is circulated through the inner passageway, the first size being at least as large as a size of the at least one conduit passage, and wherein the thermal management fluid is a liquid, and wherein at least a portion of the thermal management conduit is constructed from an electrically insulative material that is positioned adjacent to the thermally conductive polymer to provide the thermal management conduit with a multi-layered profile.

3. The apparatus of claim 1, wherein an outer wall of the thermal management conduit includes one or more ribs.

4. An apparatus comprising:
a rotor;
a stator assembly having a stator core, wherein the rotor is configured to rotate relative to the stator core; and
a thermal management conduit comprised at least in part of a thermally conductive polymer, the thermal management conduit configured to convey a liquid thermal management fluid that is in a heat exchange relation with the stator assembly,
wherein the thermal management conduit further includes a first segment coupled to a second segment, the first segment comprised of an electrically insulative material, the second segment comprised of a thermally conductive material,
wherein the first segment includes an inner passageway structured to receive circulation of the liquid thermal management fluid, and
wherein the thermally conductive material of the second segment includes magnetic material.

5. The apparatus of claim 1, wherein the thermal management conduit further includes a first segment coupled to a second segment, the first segment comprised of an electrically insulative material, the second segment comprised of a thermally conductive material, and the first segment includes an inner passageway structured to receive circulation of the liquid thermal management fluid.

6. The apparatus of claim 5, wherein the thermally conductive material of the second segment includes magnetic material.

7. The apparatus of claim 6, wherein an outer wall of the thermal management conduit includes one or more ribs.

8. The apparatus of claim 7, wherein the thermal management conduit has a first size at least when the thermal management fluid is circulated through the inner passageway, the first size being at least as large as a size of the at least one conduit passage, and wherein the thermal management fluid is a liquid, and wherein at least a portion of the thermal management conduit is constructed from an electrically insulative material that is positioned adjacent to the thermally conductive polymer to provide the thermal management conduit with a multi-layered profile.

9. The apparatus of claim 4, wherein an outer wall of the thermal management conduit includes one or more ribs.

10. The apparatus of claim 4, wherein the thermal management conduit is positioned within at least one conduit passage in the stator core.

11. The apparatus of claim 10, wherein at least one of the at least one conduit passage is positioned in at least one of the plurality of stator teeth.

* * * * *